United States Patent
Sergey et al.

(10) Patent No.: US 7,156,285 B2
(45) Date of Patent: Jan. 2, 2007

(54) COMPRESSION BONDING METHOD AND APPARATUS USING LIGHT

(75) Inventors: Potapov Sergey, Yongin (KR); Ja-nam Ku, Suwon (KR)

(73) Assignee: Samsung Electronics Co., Ltd., Kyungki-do (KR)

(*) Notice: Subject to any disclaimer, the term of this patent is extended or adjusted under 35 U.S.C. 154(b) by 257 days.

(21) Appl. No.: 10/632,919

(22) Filed: Aug. 4, 2003

(65) Prior Publication Data

US 2004/0118817 A1    Jun. 24, 2004

(30) Foreign Application Priority Data

Dec. 20, 2002  (KR) ............... 10-2002-0081864

(51) Int. Cl.
*B23K 31/00* (2006.01)
(52) U.S. Cl. .............. 228/234.1; 228/262.1; 156/272.2
(58) Field of Classification Search .......... 228/121, 228/234.1, 235.1, 262.1, 262.5, 262.51; 156/272.2, 156/272.8, 273.7
See application file for complete search history.

(56) References Cited

U.S. PATENT DOCUMENTS

| | | | |
|---|---|---|---|
| 4,534,811 A * | 8/1985 | Ainslie et al. ............. 156/73.1 |
| 4,610,746 A * | 9/1986 | Broer et al. ............. 156/275.5 |
| 5,178,319 A * | 1/1993 | Coucoulas ............... 228/235.1 |
| 5,731,244 A * | 3/1998 | Evers ........................ 438/617 |
| 6,582,548 B1 * | 6/2003 | Dautartas et al. ......... 156/272.8 |

FOREIGN PATENT DOCUMENTS

EP    1 176 440 A1    1/2002

* cited by examiner

*Primary Examiner*—Kevin P. Kerns
(74) *Attorney, Agent, or Firm*—Sughrue Mion, PLLC

(57) ABSTRACT

Provided are a method and apparatus for bonding an element, which has a transparency with respect to UV light, to a substrate. The method includes forming an aluminum layer on a surface of the substrate, disposing the element on the aluminum layer, and bonding the element to the aluminum layer by applying pressure on the element toward the aluminum layer and irradiating UV light on a bonding area between the element and the aluminum layer. The apparatus includes a holder, a pressurizing plate installed at the bottom of the holder to apply pressure on the element toward the substrate and formed of a material having a transparency to UV light, a UV light lamp which is installed in the inner space of the holder, and a collimating lens which is positioned between the UV light lamp and the pressurizing plate and collimates UV light emitted from the UV light lamp.

14 Claims, 2 Drawing Sheets

COMPRESSION BONDING METHOD AND APPARATUS USING LIGHT

BACKGROUND OF THE INVENTION

This application claims the priority of Korean Patent Application No. 2002-81864 filed Dec. 20, 2002, in the Korean Intellectual Property Office, the disclosure of which is incorporated herein in its entirety by reference.

1. Field of the Invention

The present invention relates to a method and apparatus for performing compression bonding, and more particularly, to a method and apparatus for performing compression bonding on an optical element, which is formed of silica glass having a transparency with respect to UV light, with an aluminum layer formed on a substrate.

2. Description of the Related Art

An increase in attention paid to optical communication systems has triggered the development of optical communication devices that are widely used in communication networks. In general, an optical communication device is fabricated by disposing a plurality of optical elements, such as a lens, a prism, and an optical fiber, all of which are formed of silica glass, on a silicon substrate.

To fabricate optical communication devices, a bonding process of bonding such optical elements to a predetermined position of the silicon substrate is required. An organic adhesive is used to bond such optical elements to the silicon substrate, but the organic adhesive pollutes the optical elements and electronic circuits. Thus, it is preferable that optical elements are bonded to a substrate without an adhesive in optoelectronic packaging fields.

FIG. 1 is a cross sectional view illustrating the compression bonding method disclosed in U.S. Pat. No. 5,178,319, which is an example of a conventional compression bonding method. Referring to FIG. 1, a surface of a silicon substrate 12 is coated with an aluminum layer 13, a surface of which is bonded to a spherical glass lens 11. The glass lens 11 is compressed on the aluminum layer 13 in the direction of an arrow 15, using a bonding apparatus 14, and simultaneously, the aluminum layer 13 is heated by a heater 16.

As described above, in the conventional compression bonding method, the glass lens 11 is bonded to the aluminum layer 13 coated on the silicon substrate 12 by heating the aluminum layer 13 while applying a pressure on the glass lens 11. Great care must be paid when applying heat and pressure on the spherical glass lens 11, so that the glass lens 11 is firmly attached to the aluminum layer 13 but not severely deformed or damaged. More specifically, heat and pressure are applied on the glass lens 11 within a range where the glass lens 11 is not softened or deformed. The applied pressure causes a curved surface of the spherical glass lens 11 to rupture an aluminum oxide film, which is natively formed on the aluminum layer 13, thereby having it so the silicon glass lens 11 directly contacts the pure aluminum of the aluminum layer 13.

The conventional compression bonding method is based on conditions where the optical elements, which are disposed on an optical platform, are of smaller sizes and a contact area between the optical elements and an aluminum layer is narrow. Therefore, when pressure is applied onto the optical elements within a range where the optical elements are not severely deformed, the optical elements can be penetrated into the aluminum layer. However, with the conventional compression bonding method, it is difficult to generate a sufficient bonding strength between the optical elements and the aluminum layer. The bonding mechanism of the conventional compression bonding method can be explained by a chemical-mechanical hypothesis. In particular, a chemical interaction between silica, which is a material used for a glass lens, and aluminum coated on a substrate is one major means to strengthen the bonding of the optical elements with the aluminum layer. However, silica does not substantially react with aluminum at room temperature. Thus, a bonding process temperature must be increased to 320° C., for example, in order to accelerate the chemical interaction of silica with aluminum when performing the conventional compression bonding method. However, 320° C. is high and designing a packaging process for an optical communication device in that temperature may cause critical thermal stress and failure of the optical communication device.

SUMMARY OF THE INVENTION

The present invention provides a compression bonding method in which pressure and light such as UV light are applied onto an optical element, which is formed of silica glass, in order to bond the optical element to a metal layer such as aluminum coated on a substrate, thereby firmly bonding the optical element to the metal layer without causing thermal stress on the optical element.

According to an aspect of the present invention, there is provided a compression bonding method in which an element, which is formed of a material having a transparency with respect to at least a portion of the light spectrum, is bonded to a substrate, the method comprising: forming an aluminum layer on at least a part of a surface of the substrate; disposing the element on the aluminum layer; and bonding the element to the aluminum layer by applying pressure on the element toward the aluminum layer and irradiating light to which the element is transparent, on a bonding area between the element and the aluminum layer. "Light" as used in light spectrum, is intended to include the ordinary definition of light, i.e., an electromagnetic radiation in the wavelength range including infrared, visible, ultraviolet, and X rays.

In an exemplary embodiment, the element is formed of silica glass and the substrate is a silicon substrate.

In an exemplary embodiment, the UV light is irradiated on the bonding area for a predetermined time after the application of pressure.

The aluminum layer may be a continuous layer. In this case, in an exemplary embodiment, a cross section of the element is round shape and the element is an optical element that is one of a lens, an optical fiber, and a prism.

Otherwise, the aluminum layer may be a discontinuous layer. In this case, in an exemplary embodiment, the aluminum layer is formed as strips or dots and a surface of the element which contacts the aluminum layer is substantially flat.

According to the present invention, it is possible to permanently bond a flat optical element, as well as an optical element, such as a lens which is formed of silica glass, an optical fiber, or a prism, to an aluminum layer covering a substrate by applying pressure and UV light on the element. The UV light provides activating energy which allows silica to chemically react with aluminum approximately at room temperature. Also, pressure applied onto an interface between the aluminum layer and the silica ruptures a native oxide film formed on the aluminum layer, and as a result, the silica can directly contact the pure aluminum.

The present invention also provides a compression bonding apparatus which bonds an element, which is formed of a material having transparency with respect to UV light, to a substrate, the apparatus comprising: a holder having a predetermined inner space; a pressurizing plate which is installed at the bottom of the holder in order to apply pressure on the element toward the substrate and is formed of a material having a transparency with respect to UV light; a UV light lamp which is installed in the inner space of the holder; and a collimating lens which is installed in the inner space of the holder to be positioned between the UV light lamp and the pressurizing plate and collimates UV light emitted from the UV light lamp.

The pressurizing plate may be formed of synthetic silica.

In an exemplary embodiment, the UV light lamp is a deuterium lamp.

BRIEF DESCRIPTION OF THE DRAWINGS

The above and other aspects and advantages of the present invention will become more apparent by describing in detail exemplary embodiments thereof with reference to the attached drawings in which.

DETAILED DESCRIPTION OF THE INVENTION

Figure 1:
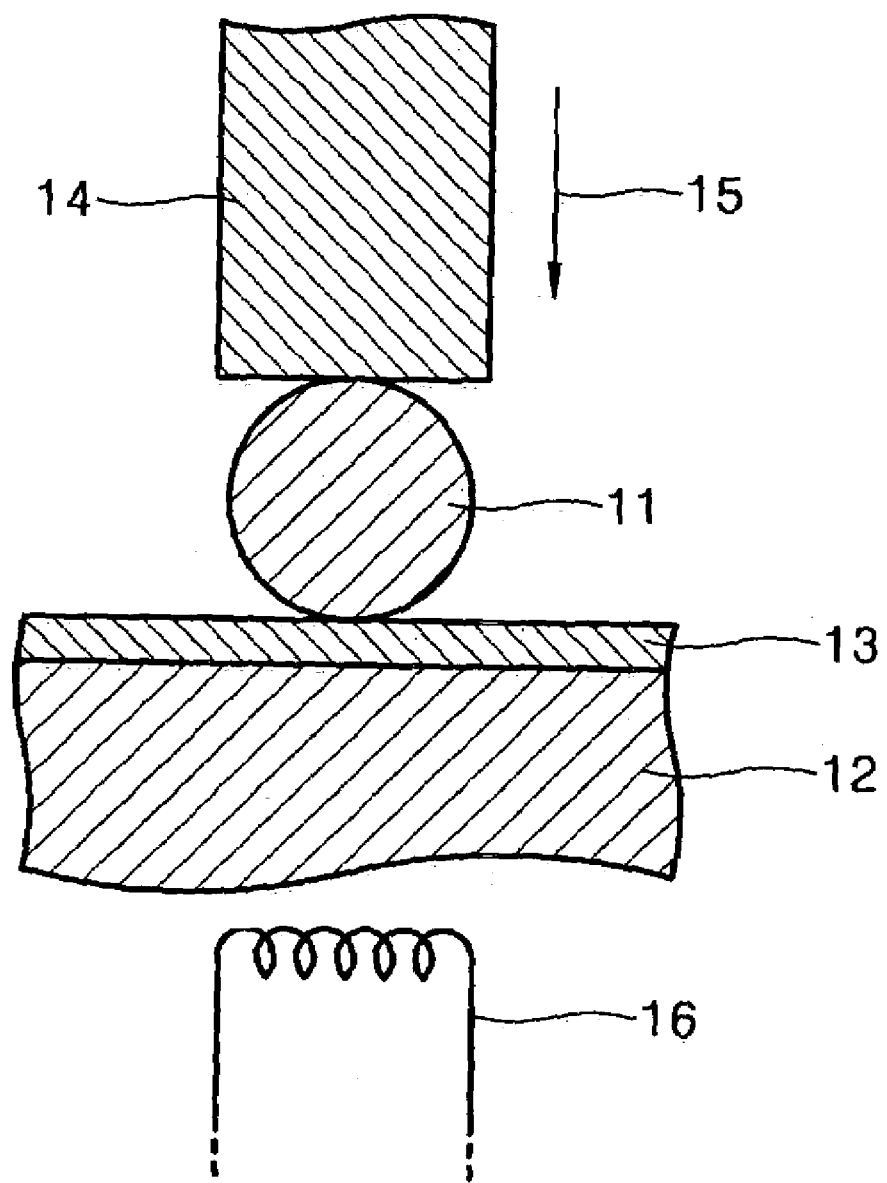
FIG. 1 is a cross-sectional view explaining a conventional compression bonding method.
Figure 2:
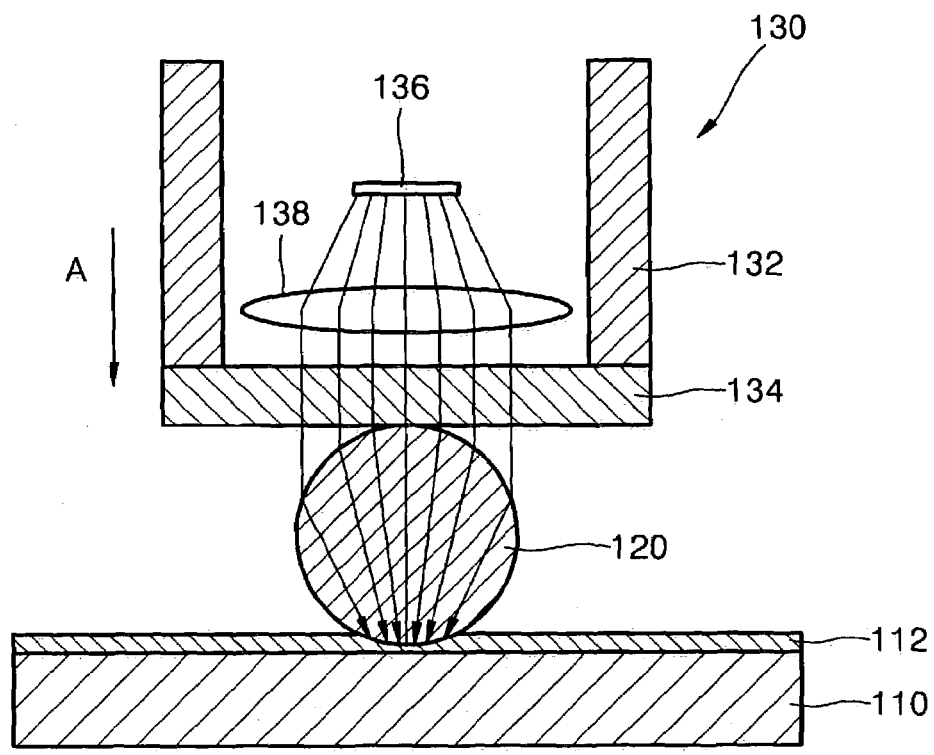
FIG. 2 is a cross-sectional view explaining a compression bonding method according to an exemplary embodiment of the present invention, which can be applied to a small optical element such as a lens and an optical fiber.

FIG. 2 is a cross-sectional view explaining a compression bonding method according to a first embodiment of the present invention, which can be applied to a small optical element such as a lens and an optical fiber. Referring to FIG. 2, an aluminum layer 112 is formed on a surface of a substrate 110. Alternatively, in another embodiment, a suitable material other than aluminum is used in layer 112. Also, in an exemplary embodiment, the substrate 110 is formed of a material, for example, silicon, so that the aluminum layer 112 can firmly adhere to the substrate 110 and the substrate 110 can endure higher mechanical loads. The aluminum layer 112 is a continuous layer that is formed to a predetermined thickness that may be formed by coating a part of or the whole surface of the substrate 110 with aluminum. Here, a coating process may be performed using sputtering or general deposition.

After the formation of the aluminum layer 112, a spherical optical lens 120 is disposed on a predetermined position of the aluminum layer 112 on the substrate 110. The optical lens 120 is formed of a transparent material, for example, silica glass, which allows UV light to pass through the optical lens 120.

Next, a predetermined pressure is applied on the optical lens 120 toward the aluminum layer 112, i.e., in the direction of an arrow A using a bonding apparatus 130. Also, when irradiating UV light on the optical lens 120, the UV light passes through the optical lens 120 and is incident upon a bonding area, i.e., a contact area, between the optical lens 120 and the aluminum layer 112. As a result, the optical lens 120 can be bonded to the aluminum layer 112.

The bonding apparatus 130 includes a holder 132 having a predetermined inner space, a pressurizing plate 134 which is installed at the bottom of the holder 132, a UV light lamp 136, and a collimating lens 138 installed in the inner space of the holder 132.

Alternatively, in yet another embodiment, light outside the UV wavelength range and a suitable light emitting device are used.

The pressurizing plate 134 is used to compress the optical lens 120 toward the substrate 110, and is thus formed of a material having high mechanical strength. Also, the pressurizing plate 134 is formed of a transparent material which allows UV light to be emitted from the UV light lamp 136 to pass through the pressurizing plate 134. To satisfy the above two conditions, the pressurizing plate 134 may be formed of synthetic silica. The UV light lamp 136 may be a deuterium lamp. The collimating lens 138 is placed between the UV light lamp 136 and the pressurizing plate 134 in order to collimate UV light emitted from the UV light lamp 136.

During a bonding process performed by the bonding apparatus 130, the intensity of pressure applied onto the optical lens 120 must be adjusted to rupture an oxide film which is natively formed on the aluminum layer 112 on the substrate 110. If the native oxide film is ruptured, the optical lens 120 penetrates into the aluminum layer 112, and thus, the silica of the optical elements 120 directly contacts pure aluminum in the aluminum layer 112, thereby causing a chemical interaction of the aluminum with the silica. In this case, the intensity of the pressure applied onto the optical lens 120 must be controlled so as not to severely deform the optical lens 120.

Further, UV light is irradiated on a bonding area, i.e., a contact area, between the optical lens 120 and the aluminum layer 112, so as to chemically react the aluminum with the silica. The UV light passes through the optical lens 120 and is incident upon the bonding area.

The UV light can be irradiated on the bonding area concurrently with the application of pressure. In this case, the optical lens 120 is substantially bonded to the aluminum layer 112 adjacent to the center of the bonding area. This is because large displacement of the aluminum of the aluminum layer 112 occurs at the periphery of the bonding area in a beginning stage when pressure is applied. In contrast, the center of the bonding area is more greatly affected by the application of pressure than the edges of the bonding area, and therefore, the aluminum can contact the silica more closely.

For this reason, in an exemplary embodiment, the irradiation of the UV light is made a predetermined time, for example, several seconds, after the application of the pressure. Accordingly, an effective bonding area and the bonding strength of bonding can be further increased since the optical lens 120 is bonded to the aluminum layer 112 at a steady state when there is no displacement of the aluminum.

Figure 3:
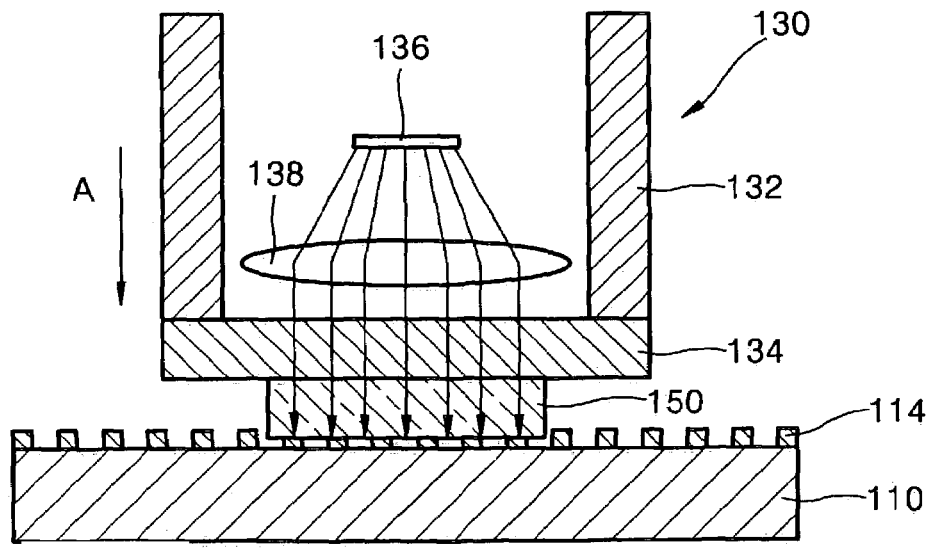
FIG. 3 is a cross-sectional view explaining a compression bonding method according to another embodiment of the present invention, which can be applied to a large or flat optical element.

FIG. 3 is a cross-sectional view illustrating a compression bonding method according to a second embodiment of the present invention, which can be applied to a large or substantially flat optical element. Elements that are the same as those in FIG. 2 are indicated with the same reference numerals and their descriptions will not be repeated.

Referring to FIG. 3, the compression bonding method according to the second embodiment is almost the same as that according to the first embodiment, except for the shape of an aluminum layer 114 formed on a substrate 110 and a silica glass plate 150 bonded to the aluminum layer 114. As shown in FIG. 3, if an optical element bonded to the aluminum layer 114 is the silica glass plate 150, i.e., a substantially flat optical element, a contact area between the aluminum layer 114 and the silica glass plate 150 becomes wider. In this case, if the aluminum layer 114 is a continuous layer as in the first embodiment, it is difficult to generate pressure sufficient enough to rupture an oxide film which is natively formed on the aluminum layer 114. Therefore, the aluminum layer 114 according to the second embodiment is formed to be discontinuous so that a native oxide film thereon can be easily ruptured by applying relatively less pressure. For instance, the aluminum layer 114 may be formed as strips or dots. The aluminum layer 114 may be formed by coating at least a part of a surface of the substrate 110 with aluminum as described above and patterning the aluminum layer to be strips or dots.

In the compression bonding method according to the second embodiment, UV light is also irradiated on a bonding area between the aluminum layer 114 and the silica glass plate 150 a predetermined time after a beginning stage of the bonding of the aluminum layer 114 and the silica glass plate 150, i.e., the application of the pressure, thereby increasing the strength of bonding.

In the present invention as described above, UV light is irradiated on the bonding area to provide activating energy thereon, thereby chemically reacting the silica with the aluminum. An optical element, which is formed of a material having higher transparency with respect to UV light having a wavelength of not less than approximately 180 nm, can be bonded to an aluminum layer formed on a substrate by applying pressure and UV light on the optical element. In general, optical lenses, which are used in optical communication fields, are formed of sapphire or silica glass which has a higher transparency with respect to UV light. During a bonding process, silica contacts pure aluminum when the application of pressure results in the rupture of a native oxide film formed on an aluminum layer. Also, when UV light having a wavelength of more than approximately 180 nm is irradiated on a bonding area, silica chemically reacts with aluminum approximately at room temperature as described in detail later, and as a result, an optical element formed of silica can be bonded to the aluminum layer.

Small-sized optical elements of less than 1 mm, for example, such as a lens, an optical fiber, and a prism, can be bonded to a substrate coated with an aluminum layer which is a continuous layer as in the first embodiment of the present invention. In an exemplary embodiment, the optical elements are spherical but their shapes are not thus limited. If the size of an optical element is very small although it is not spherical, a contact area between the optical element and an aluminum layer is narrow. In this case, pressure is applied to the optical element in order to rupture a native oxide film formed on the aluminum layer.

Meanwhile, in order to bond large or substantially flat optical elements to a substrate, an aluminum layer is formed as strips or dots so that an oxide film, which is natively formed on the aluminum layer, can be easily ruptured by the application of less pressure, as suggested in the second embodiment of the present invention.

As described above, a compression bonding method according to the present invention is advantageous in that it can be performed at approximately room temperature by applying only pressure and UV light. Therefore, this method is employed, for example, in situations where a package is sensitive to thermal loads.

Hereinafter, a mechanism for bonding silica with aluminum will be explained.

In the present invention, a deuterium lamp is used as a UV light source that emits UV light having a continuous spectrum of wavelengths starting from about 116 nm. Aspects of the present invention related to the absorption of a portion of the spectrum during a compression bonding process and the mechanism of chemical reaction causing the bonding of an aluminum layer with an optical element are based at least in part on experimental results. However, it is possible to estimate the mechanism of the chemical reaction causing the bonding process from data included in relevant technical documents. It is well known that elements of a hydroxyl group are present at a surface of silica. For instance, various types of glass and crystal, which can be expressed as $SiO_2$ and other metal oxides such as $LiO_2$, $B_2O_3$, and $Na_2O$, belong to the hydroxyl group. It is noted that UV light having energy of about 4.7 eV, i.e., 264 nm, is strongly absorbed by a surface of glass or crystal. When UV light is irradiated on a surface of an optical element, solidified mutants are produced on the surface. The compositions of the mutants are unknown. However, the aforementioned information reveals that when pure aluminum is exposed at the surface during the chemical reaction, a potential barrier of interaction is reduced and thus the chemical reaction between aluminum and $SiO_2$ or other oxides is possible at lower temperatures.

It is known that an oxygen atom is replaced with a hydrogen ion H+during a knock-on process using UV light having energy of 5 eV (248 nm), thereby enabling the formation of oxygen vacancy. During such a process, oxidation of aluminum can be stimulated. It is also known that the absorption of UV light depends on the composition of the glass. For example, a sample of $25Na_2O\cdot 75SiO_2$ has an absorption edge which absorbs UV light having a wavelength of 340 nm. A photon of 7.9 eV (157 nm) causes strong material interactions near the band-edge states of fused silica and glasses. This phenomenon is used for machining micro-optical components. Further, this mechanism can be used to explain the interaction between aluminum and glass at a lower temperature.

When light emitted from a xenon excimer lamp is irradiated on a surface of silica, a film having a composition of $SiO_x$ (x<2) is formed on the surface. It is understood that the irradiation of the light destroys some of Si—O bands. If a $SiO_2$ film is excited by a UV light having a wavelength of 340 nm, the $SiO_2$ produces a broad emission band centered at a wavelength of about 415 nm. A photo-luminescence in this spectral region is due to oxygen vacancies associated with electrons on bridge oxygen atoms of silaxane linkages. Under the excitation of induced phonon and photon, in an exemplary embodiment, the bonding of two elements is made at an Al-h center tunnelling the potential barrier. Aluminum has an electron work function of 4.25 eV (292 nm), which is very useful for the interaction. During the irradiation of UV light, two electrical layers develop near a surface of an element on which the UV light is irradiated. These electrical layers are not uniform. An electric field and energetic electrons also help interaction of Al—Si—OH and diffusion of the developed Al-h center.

Accordingly, it can be concluded that there are many possible mechanisms of interaction between aluminum and silica or silica glass caused by the application of UV light having a sufficient energy level and intensity. Such an interaction is too complicated to be completely analysed, and thus, additional research thereof is required. However, it is apparent that aluminum can chemically react with silica even at room temperature under UV light having a sufficient energy level and intensity.

As described above, in a compression bonding method according to the present invention, it is possible to permanently bond an optical element, such as a lens, an optical fiber, or a prism, which is formed of silica glass, to an aluminum layer formed on a substrate by applying pressure on the optical element and irradiating UV light on a bonding area between the aluminum layer and the optical element. In this case, the shape of the optical element is not limited to certain shapes. That is, the optical element can be easily bonded to the aluminum layer independent of whether the optical element is spherical or flat-shaped. Also, the compression bonding method according to the present invention does not require a heating process, that is, this method can be performed approximately at room temperature. Therefore, it is possible to prevent thermal loads from weighing down a package such as an optical communication device.

While this invention has been particularly shown and described with reference to exemplary embodiments thereof, it will be understood by those skilled in the art that various changes in form and details may be made therein without departing from the spirit and scope of the invention as defined by the appended claims. For instance, a compression bonding method according to the present invention can be applied to various kinds of technical fields including an optical communication field.

What is claimed is:

1. A compression bonding method in which an element is bonded to a substrate, the method comprising:
   forming a layer having metal on at least a part of a surface of the substrate;
   disposing the element on the layer; and
   bonding the element to the layer by applying pressure on the element toward the layer and irradiating light to which the element is transparent, on a bonding area between the element and the layer, wherein the layer is a discontinuous layer.

2. The method of claim 1, wherein the light provides activating energy which allows an interaction between the layer and the element approximately at room temperature.

3. The method of claim 1, wherein the element is formed of silica glass.

4. The method of claim 1, wherein the substrate is a silicon substrate.

5. The method of claim 1, wherein the light is irradiated on the bonding area for a predetermined time after the application of pressure.

6. The method of claim 1, wherein the light has a wavelength of not less than approximately 180 nm.

7. The method of claim 1, wherein the pressure, which acts at an interface between the layer and the element, ruptures a native oxide film on the layer and allows the element to contact a non-oxidized element of the layer.

8. The method of claim 7, wherein the non-oxidized element is aluminum.

9. The method of claim 1, wherein a cross section of the element is round.

10. The method of claim 1, wherein the element is an optical element that is one of a lens, an optical fiber, and a prism.

11. The method of claim 1, wherein the layer is formed as ships or dots.

12. The method of claim 1, wherein a surface of the element which contacts the layer is substantially flat.

13. The method of claim 1, wherein the light is substantially in the UV wavelength range.

14. The method of claim 1, wherein the metal includes aluminum.

* * * * *